United States Patent
Craig et al.

(10) Patent No.: US 8,074,841 B1
(45) Date of Patent: Dec. 13, 2011

(54) FOOD CONTAINERS AND DISPENSERS WITH DUAL COMPARTMENTS FOR STORAGE AND DISPOSAL

(76) Inventors: Darrin Leslie Craig, Wilton, CA (US); Peter Schmidt, San Jose, CA (US)

( * ) Notice: Subject to any disclaimer, the term of this patent is extended or adjusted under 35 U.S.C. 154(b) by 599 days.

(21) Appl. No.: 12/171,167

(22) Filed: Jul. 10, 2008

(51) Int. Cl.
- B67D 7/74 (2010.01)
- B67D 7/88 (2010.01)
- B67D 7/78 (2010.01)
- A47G 19/00 (2006.01)

(52) U.S. Cl. ........... 222/129; 222/134; 222/464.5; 222/144; 222/142.2; 220/23.86; 220/23.83; 220/8

(58) Field of Classification Search ........ 221/174, 221/97, 256, 90, 154, 65; 220/23.86, 23.83, 220/8; 222/129, 192, 94, 92, 93, 95, 134, 222/144, 142.2, 464.5; 206/506
See application file for complete search history.

(56) References Cited

U.S. PATENT DOCUMENTS

| | | | |
|---|---|---|---|
| 2,352,066 A | 6/1944 | Afpelbaum | |
| 3,105,592 A * | 10/1963 | Cohen | 206/0.8 |
| 3,221,928 A | 12/1965 | Horn | |
| 4,151,910 A | 5/1979 | Yasur | |
| 4,205,766 A | 6/1980 | White | |
| 4,860,927 A | 8/1989 | Grinde | |
| 5,316,159 A | 5/1994 | Douglas | |
| 5,409,131 A * | 4/1995 | Phillips et al. | 220/717 |
| 5,535,889 A | 7/1996 | Lin | |
| 6,179,146 B1 | 1/2001 | Betras | |
| 6,264,068 B1 * | 7/2001 | Ours et al. | 222/129 |
| 6,398,071 B1 * | 6/2002 | Fellers | 221/174 |
| 6,863,192 B2 | 3/2005 | Tumlinson | |
| 6,955,028 B1 | 10/2005 | Dunaway | |
| D536,582 S | 2/2007 | Roth | |
| 7,243,813 B2 * | 7/2007 | Krueger | 220/571 |
| 7,350,688 B2 * | 4/2008 | Sierra-Gomez et al. | 229/87.08 |
| 2002/0155202 A1 | 10/2002 | Rebhorn | |
| 2003/0201270 A1 | 10/2003 | Fahey | |
| 2005/0161424 A1 | 7/2005 | Hogan | |

FOREIGN PATENT DOCUMENTS

| | | |
|---|---|---|
| DE | 102006001217 | 8/2006 |
| GB | 2357072 | 6/2001 |

* cited by examiner

*Primary Examiner* — Mickey Yu
*Assistant Examiner* — Kareen Rush
(74) *Attorney, Agent, or Firm* — Workman Nydegger (57) ABSTRACT

An expandable dual-compartment container for the dispensing of food product and the storage of food waste product. The dual-compartment container includes a first compartment that defines a first cavity and a second compartment that is moveable in relation to the first cavity so as to define a second cavity. The second compartment has a first opening and a second opening. The dual-compartment container also includes a connection means for placing the first compartment in communication with the second opening such that food stored in the first compartment can be dispensed through the second opening.

24 Claims, 9 Drawing Sheets

FOOD CONTAINERS AND DISPENSERS WITH DUAL COMPARTMENTS FOR STORAGE AND DISPOSAL

CROSS-REFERENCE TO RELATED APPLICATIONS

Not applicable.

BACKGROUND

Food products such as sunflower seeds, pistachios, peanuts, other shelled nuts and similar food items are popular snacks enjoyed by many people. However, eating these products can be problematic. For example, it is often difficult to dispense of these types of food products from a container when involved in certain activities that require the use of at least one hand.

In addition, eating these types of food products can often be quite messy. For example, these types of food products typically include an inner nut or seed that is surrounded by an outer shell. Since it is the inner seed or nut that is to be eaten, the outer shell must first be removed. Once removed, the outer shell must then be discarded. If there is no readily available place to discard the outer shell, the eater may simply throw the outer shells onto the ground, thus creating the mess.

Sunflower seeds, in particular, have the potential to create a mess due the manner in which they are usually eaten. An eater typically places several sunflower seeds into his or her mouth, shells the seeds in the mouth, and then spits out the shells. The discarded shells may include saliva and germs from the eater's mouth. As can be appreciated, if the eater spits out the shells onto the ground, a large mess may be created.

Accordingly, there is a need in the art for a container that provides a way to easily dispense of a desired food product and a place to dispose of any food waste product.

BRIEF SUMMARY

The embodiments disclosed herein relate to dual-compartment containers configured to store and dispense food product, such as sunflower seeds and shelled nuts, and configured to receive food storage waste, such as shells and the like. One embodiment disclosed herein relates to a food dispensing and waste storage container assembly. The assembly includes a first opening and a second opening. The assembly further includes a first compartment that defines a first cavity and a second compartment that is moveable in relation to the first compartment. In a first position, a portion of the first compartment is contained within the second compartment and, in a second position, the second compartment defines a second cavity.

An additional embodiment disclosed herein relates to a container that includes a first compartment defining a first cavity and a second compartment housing at least a portion of the first compartment. The second compartment has a first opening and a second opening and is movable relative to the first compartment to form a second cavity. The container also includes a tube coupled to the first opening and the first cavity such that food contained in the first cavity can be dispensed through the second opening.

A further embodiment disclosed herein relates to an expandable dual-compartment container for the dispensing of food product and the storage of food waste product. The dual-compartment container includes a first compartment that defines a first cavity and a second compartment that is moveable in relation to the first cavity so as to define a second cavity. The second compartment has a first opening and a second opening. The dual-compartment container also includes a connection means for placing the first compartment in communication with the second opening such that food stored in the first compartment can be dispensed through the second opening.

The assemblies and containers described herein provide a convenient mechanism for storing food product and dispensing the products into the eater's mouth. The collapsible nature of the containers permits the containers to be shipped and stored in a manner that reduces the required shelf space and volume. The structure of the containers enables eaters to dispense the food product directly into the mouth while using only one hand. The assemblies and containers described herein also provide a convenient mechanism to receive waste material, such as shells, after the food product has been consumed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The principles of the present invention are directed towards a dual-compartment food container assembly that provides for the dispensing of food product, such as sunflower seeds and various shelled nuts, and that also provides an area for the storage for food waste product, such as sunflower seed shells or nut shells. Turning now to the drawings, in which several similar reference characters denote similar elements throughout, FIGS. 1-9 illustrate various aspects of embodiments of the present invention. It is to be understood that the drawings are diagrammatic and schematic representations of the embodiments disclosed herein, and are not limiting of the present invention, nor are they necessarily drawn to scale. It is also to be understood that the use of the terms "first", "second", and so forth to describe two or more elements (for example, a first lid and a second lid) in this description and in the claims is for the purpose of distinguishing the elements from one another and is not meant to imply sequential ordering unless explicitly stated.

Figure 1:
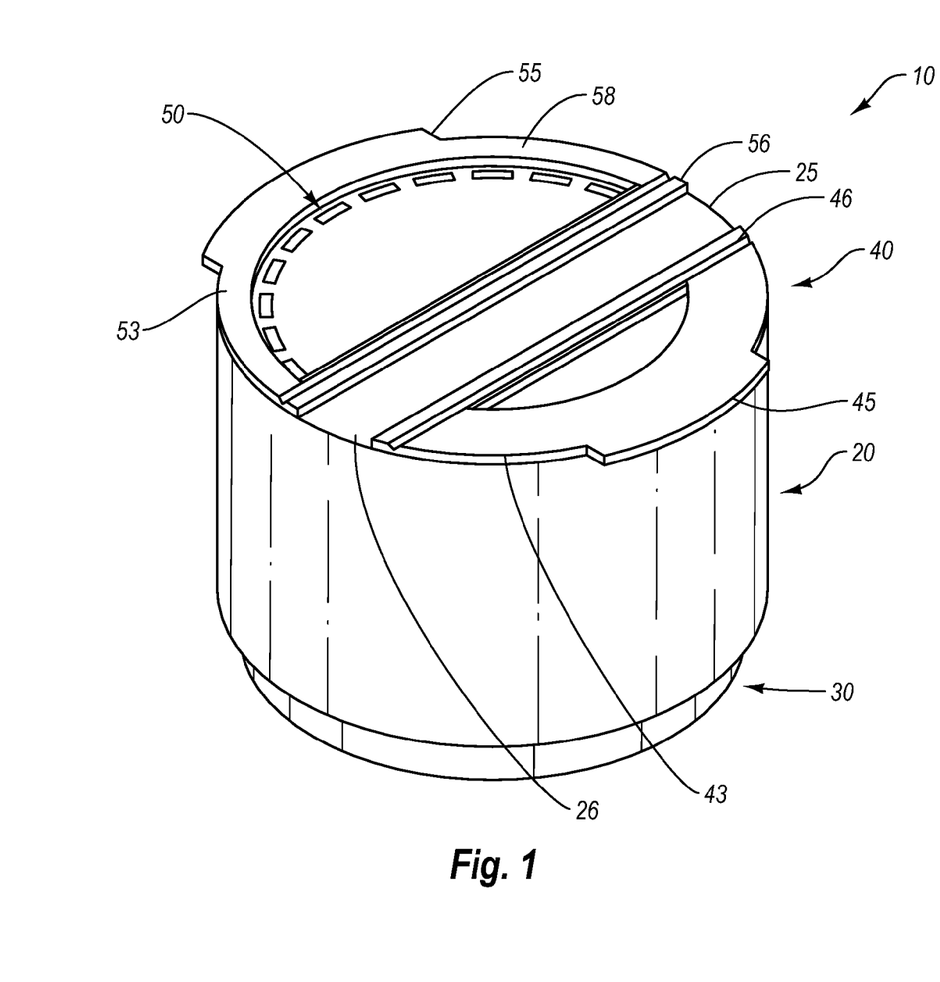
FIG. 1 illustrates a view of one embodiment of the present invention.

FIG. 1 illustrates one embodiment of the present invention, in which a dual-compartment food container 10 provides for the dispensing of food product, such as sunflower seeds and various shelled nuts, and that also provides an area for the storage of food waste product, such as sunflower seed or nut shells. Specifically, dual-compartment food container 10 includes an outer cup 20 and an inner cup 30, which is nested in relation to outer cup 20. Outer cup 20 may be configured to provide a cavity for the storage of food waste product, such as sunflower seed or nut shells, while nested inner cup 30 may be configured to provide a cavity for storage and dispensing of food product, such as sunflower seeds and various shelled nuts prior to their being eaten. Of course, it will be appreciated that other types of food products may also be stored and/or disposed of in outer cup 20 and/or nested inner cup 30. Dual-compartment food container 10, as will be explained in more detail to follow, is configured to be expandable such that inner cup 30 is no longer completely nested within outer cup 20.

As used hereinbelow, the term "food product" refers to sunflower seeds, various shelled nuts or seeds, and any other food that is suitable to be stored and dispensed by the containers of the invention. The term "food waste product," as used hereinbelow, refers to sunflower seed shells, husks or shells associated with nuts or other seeds, or any other residual products associated with a food product. Outer cup 20 and inner cup 30 are examples of compartments for storing food waste product and food product, respectively.

In one embodiment, outer cup 20 and nested inner cup 30 may be formed from plastic or any other suitable material known in the art. The material forming outer cup 20 and nested inner cup 30 is preferably relatively low-cost, easily manufactured, and disposable. The material may be opaque to hide the products stored within or it may be clear or transparent so that the product stored within may be visible. It can be environmentally and perhaps economically advantageous if the plastic or other material is biodegradable so that it can be easily thrown away by the user with minimal environmental impact, although the principles of the present invention are not limited to this type of plastic.

As further illustrated in FIG. 1, dual-compartment food container 10 includes a lid or seal 40 coupled to a top surface 25 of outer cup 20. In one embodiment, lid 40 is configured to open and close to allow for the dispensing of the food product stored in nested inner cup 30, and may be formed from the same material as outer cup 20 and nested inner cup 30. Accordingly, lid 40 may include a pivot joint 46 that is configured to pivot up when lid 40 is opened and pivot down when lid 40 is closed. In some embodiments, pivot joint 46 may be formed from a thin strip of plastic that is affixed to top surface 25. It will be appreciated that other types of pivot joints known in the art may also be used. When in a closed position, an outer edge 43 of lid 40 is configured to sit on top of an outer edge 26 of top surface 25. Further, lid 40 may include an extended edge portion 45 that extends beyond outer cup 20 for a small distance to allow for ease of opening and closing lid 40.

Dual-compartment food container 10 also includes a lid or seal 50 that is also coupled to top surface 25. In some embodiments, lid 50 is configured to open and close to allow for the storage of food waste product such as sunflower seed shells and nut shells in outer cup 20. Lid 50 may be formed from the same material as outer cup 20 or nested inner cup 30 and may include a pivot joint 56 that is configured to pivot up when lid 50 is opened and pivot down when lid 50 is closed. In some embodiments, pivot joint 56 may be formed from a thin strip of plastic that is affixed to top surface 25. It will be appreciated that other types of pivot joints known in the art may also be used. When in a closed position, an outer edge 53 of lid 50 is configured to sit on top of outer edge 26 of top surface 25. Further, lid 50 may include an extended edge portion 55 that extends beyond outer cup 20 for a small distance to allow for ease of opening and closing lid 50. In some embodiments, stickers or other indicators may be affixed to lids 40 and 50 or some other portion of dual-compartment food container 10 to clearly indicate which lid covers the opening for dispensing the food product and which opening discloses the opening for receiving the food waste product.

Certain types of nuts and seeds, for example sunflower seeds, are typically consumed as the eater shells the seed or nut in his or her mouth to remove the edible portion of the seed or nut. The eater then often spits out the seed shell or nut shell that is not eaten. These seed shells or nut shells may be spit into or otherwise placed in outer cup 20 by the eater. As may be appreciated, in such circumstances, the disposed shells may include saliva and germs from the eater's mouth. This saliva may cause outer cup 20 to begin to emit an unpleasant odor when lid 50 is opened. Accordingly, in some embodiments, lid 50 may include vents or slots 58. As illustrated, vents or slots 58 are holes or openings formed in the lid 50 and are configured to vent outer cup 20 when lid 50 is in a closed position. Advantageously, this helps to prevent unpleasant odors from forming in outer cup 20 as air entering through vents or slots 58 is able to at least partially dry out the shells in outer cup 20. Vents or slots 58 may be created in lid 50 by various techniques known in the art.

Figure 2A:
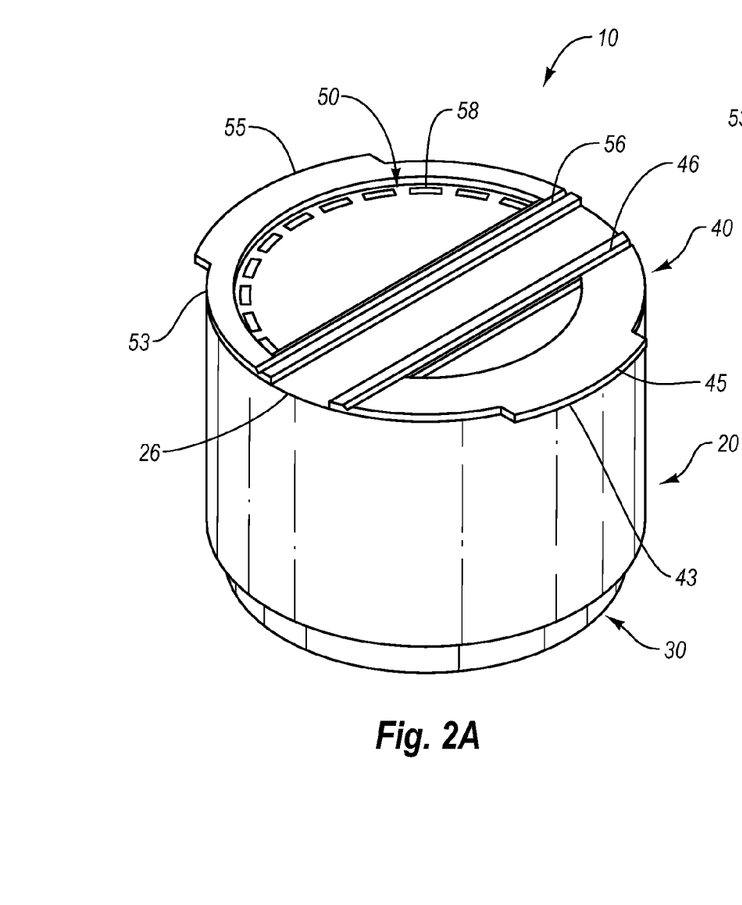
FIGS. 2A and 2B illustrate alternative views of an embodiment of the present invention.
Figure 2B:
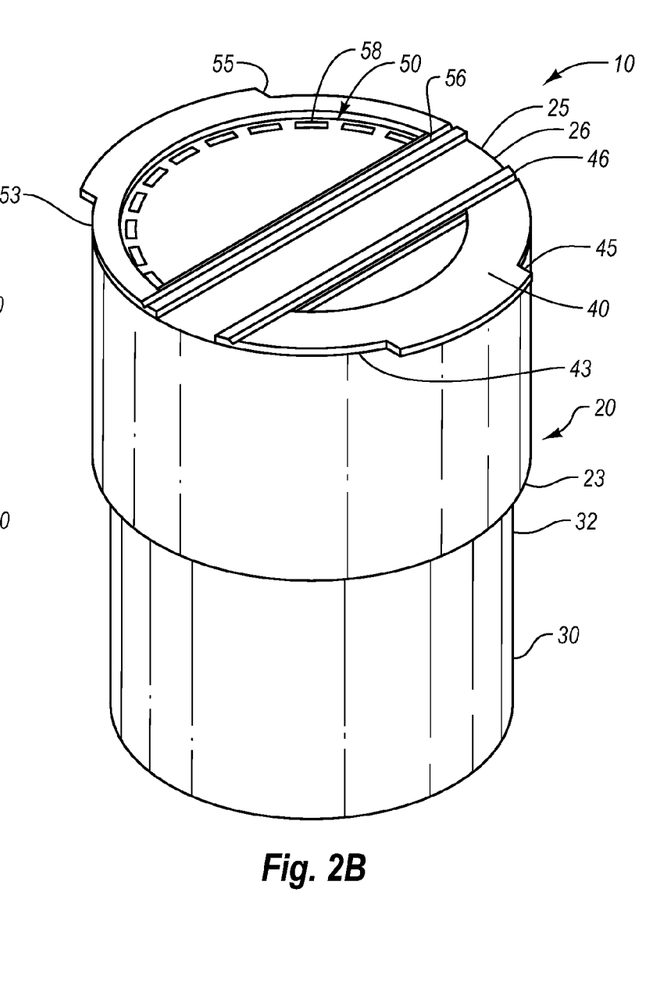

Turning to FIGS. 2A and 2B, alternative views of an embodiment of the present invention are illustrated. FIG. 2A illustrates dual-compartment food container 10 in a collapsed, or non-extended, position. In other words, outer cup 20 has not been extended to expose nested inner cup 30. FIG. 2B, on the other hand, illustrates dual-compartment food container 10 in the extended position. As shown, extending dual-compartment food container 10 exposes nested inner cup 30. As will be explained in more detail to follow, extending dual-compartment food container 10 also causes outer cup 20 to define a cavity for holding the food waste product.

Configuring dual-compartment food container 10 to be extendable or expandable has several advantages. For example, when in the collapsed, or non-extended, position of FIG. 2A, dual-compartment food container 10 is small and compact. This allows for ease of packing and shipping. Further, the compact nature makes it easy to stack on a shelf in a retail store.

In some embodiments, dual-compartment food container 10 may be extended by a user pulling upwards on outer cup 20. This upward pulling force will typically cause outer cup 20 to move upward until a lower portion 23 of outer cup 20 engages an upper portion 32 of nested inner cup 30, thereby causing an interference fit between portions 23 and 32 to occur that prevents outer cup 20 from falling back onto nested inner cup 30. As will appreciated by those of skill in the art, the lower portion 23 and/or the upper portion 32 may be tapered as needed to facilitate the interference fit. Of course, it will also be appreciated that other reasonable methods may be used to create the interference fit and that other methods may be applied other than an interference fit to keep outer cup 20 from falling back onto nested inner cup 30.

If desired, a user may collapse dual-compartment food container 10 back into the non-extended position of FIG. 2A. In one embodiment, this may be done by the user exerting downward pressure on top surface 25 or some other portion of outer cup 20. The downward pressure may then cause bottom portion 23 and top portion 32 to disengage, thus removing the interference fit and allowing outer cup 20 to collapse onto nested inner cup 30. As will be appreciated, other methods of collapsing dual-compartment container 10 may also be employed.

Figure 3A:
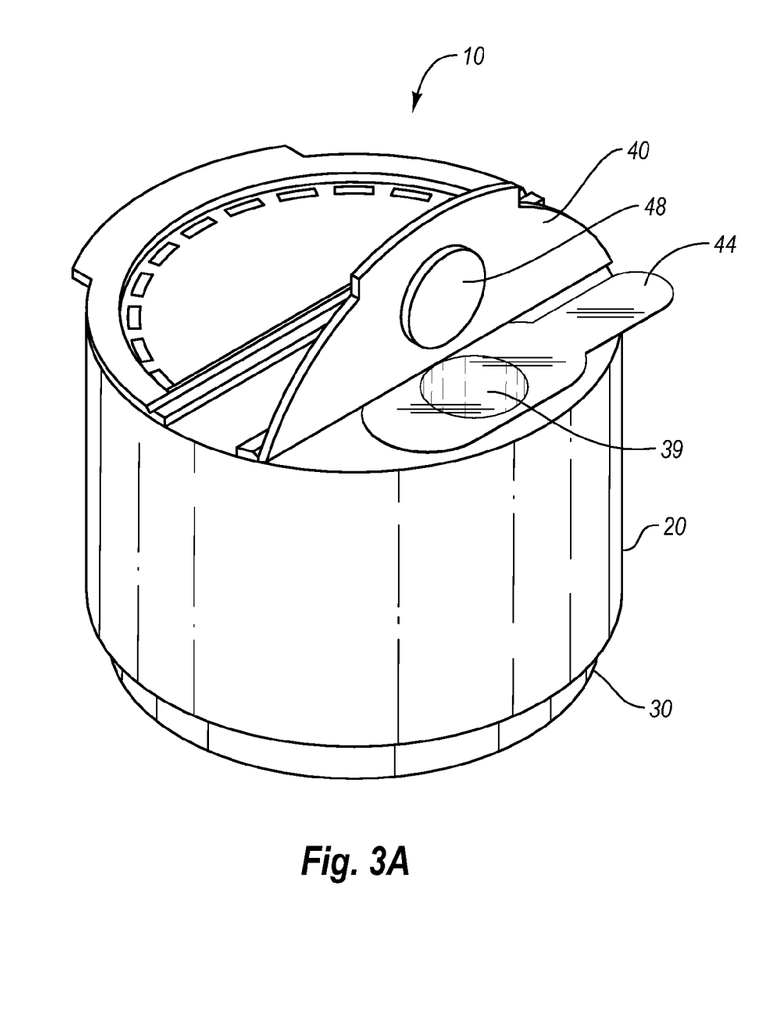
FIG. 3A illustrates an additional view of an embodiment of the present invention.

Turning now to FIG. 3A, an additional view of an embodiment of the present invention is illustrated. For clarity, only some of the elements have been labeled in this figure and in the figures to follow. As shown, in some embodiments dual-compartment food container 10 also includes a seal 44, which may be foil, cellophane, or other reasonable sealing material. Seal 44 is configured to seal nested inner cup 30 to preserve the freshness of any food product stored within nested inner cup 30 by covering an opening 39 in surface 25 that allows for the dispensing of sunflower seeds, nuts, and the like from nested inner cup 30. As illustrated, seal 44 may include an end that extends out from outer cup 20 to facilitate the removal of seal 44.

Referring again to FIG. 3A, lid 40 is shown to include a protruding portion 48 on the underside of lid 40. Protruding portion 48, which may be formed from the same material as lid 40, is configured to seal opening 39 after the removal of seal 44 when lid 40 is in a closed position. In this way, opening 39 may be resealed as needed by a user of dual-compartment food container 10 to ensure freshness of any food product stored within nested inner cup 30 after the removal of seal 44. Although not illustrated, lid 50 may also include a protruding portion similar to portion 48.

Figure 3B:
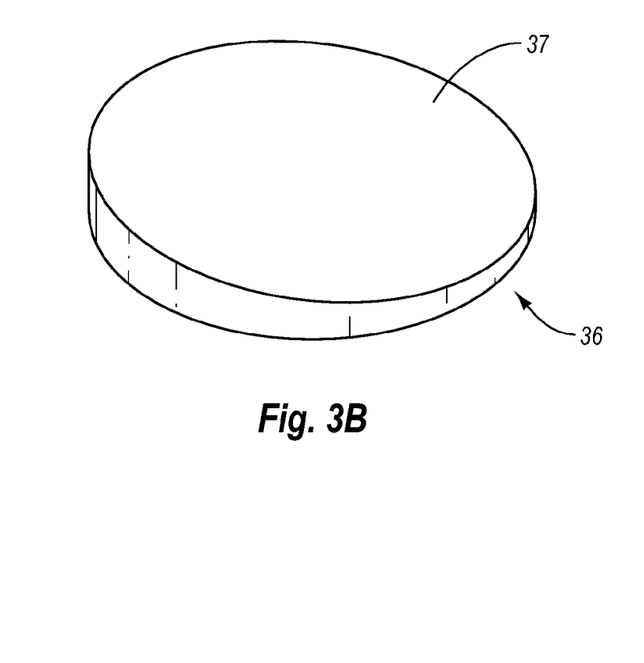
FIG. 3B illustrates an embodiment of a bottom surface of the present invention.

Referring to FIG. 3B, an embodiment of a bottom surface 36 of nested inner cup 30 is illustrated. Bottom surface 36 acts as a bottom surface of dual-compartment food container 10. In some embodiments, bottom surface 36 may include a sloped inner surface 37 as shown in FIG. 3B. As will be described in more detail to follow, sloped inner surface 37 may aid in the dispensing of any food product contained in nested inner cup 30. Bottom surface 36, including sloped inner surface 37, may be formed from the same material as nested inner cup 30. Note that although the following figures and description show sloped inner surface 37, it will be appreciated that bottom surface 36 may include an inner surface that is not sloped. Accordingly, sloped inner surface 37 should not be used to limit the scope of the embodiments disclosed herein.

Figure 4A:
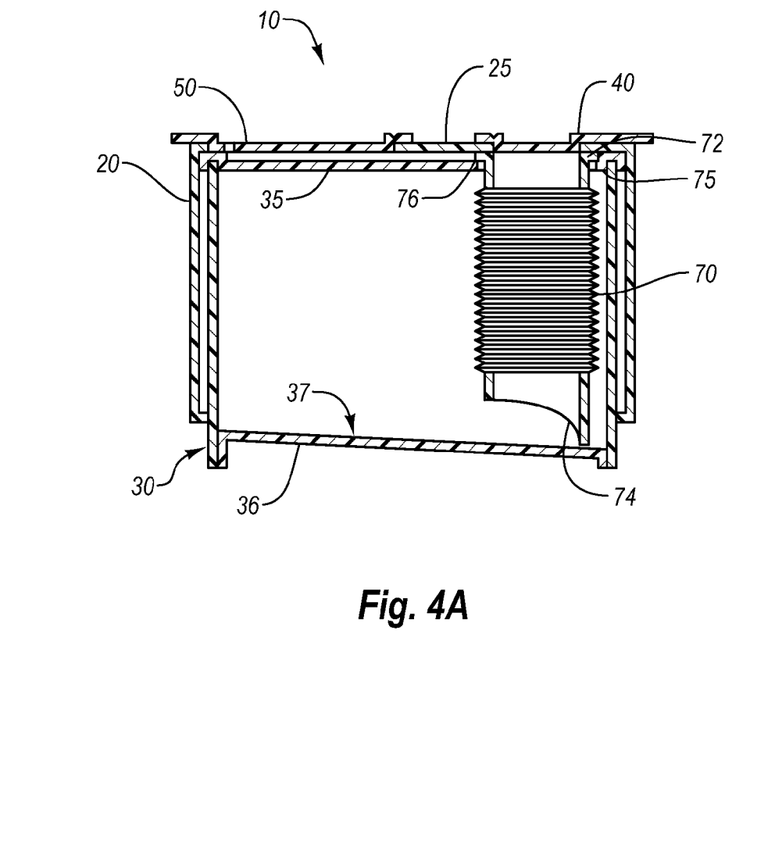
FIGS. 4A and 4B illustrate interior views of an embodiment of the present invention.
Figure 4B:
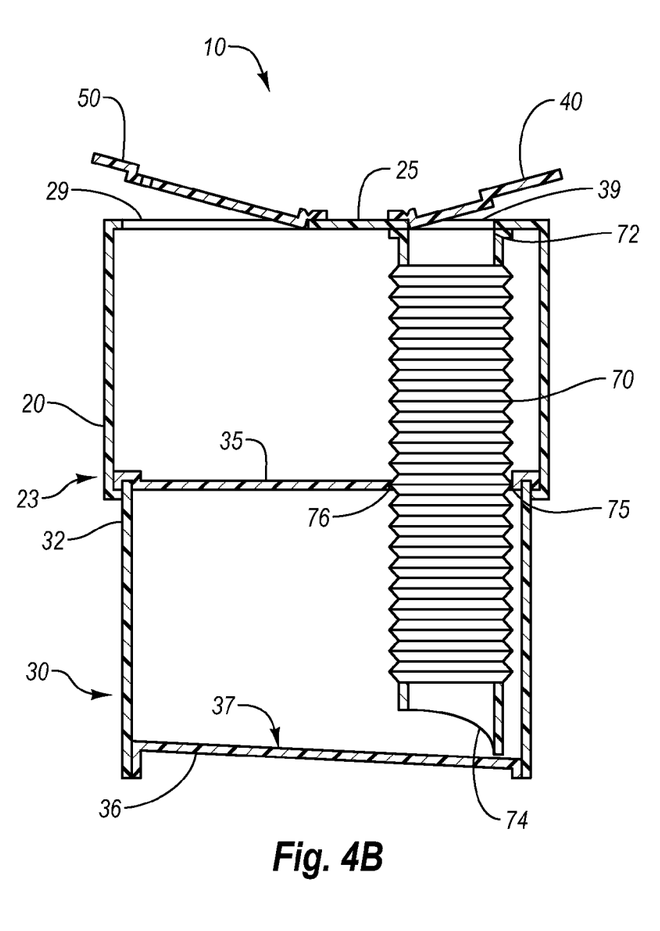

Turning now to FIGS. 4A and 4B, interior views of an embodiment of the present invention are illustrated. FIG. 4A illustrates the interior of dual-compartment food container 10 when in a collapsed or non-extended or non-expanded position. As shown in FIG. 4A, when in a collapsed position, nested inner cup 30 is almost completely contained within outer cup 20. When in an expanded or extended position, as illustrated in FIG. 4B, a top surface 35 of nested inner cup 30 also acts as a floor or bottom surface of outer cup 20. As explained previously, in one embodiment lower portion 23 of outer cup 20 and upper portion 32 of nested inner cup 30 engage to form an interference fit when dual-compartment food container 10 is in the extended position.

As illustrated in FIGS. 4A and 4B, dual-compartment food container 10 also includes connection means for placing the nested inner cup 30 into communication with opening 39 such that food product stored in the nested inner cup may be dispensed at the opening. For example, in some embodiments, an extendable tube 70 having a concertina structure, including a plurality of annular pleats, serves this function. Accordingly, extendable tube 70 is one example of such connecting means. Expandable tube 70 may be formed from plastic or some other suitable material with sufficient elasticity to allow for expanding and collapsing.

Expandable tube 70 includes a top end 72 that is affixed to the bottom of top surface 25 by any suitable means so as to be near to opening 39. In one embodiment, an opening 75 in surface 35 is provided to allow expandable tube 70 access through outer cup 20 to nested inner cup 30. Expandable tube 70 also includes a bottom end 74 that sits near bottom surface 36 of nested inner cup 30. Bottom end 74 includes an opening that allows the sunflower seeds, nuts, or like food product to enter tube 70 and thus be dispensed at opening 39.

When dual-compartment food container 10 is in the collapsed position as in FIG. 4A, tube 70 is also in a collapsed position. In some embodiments, a seal 76 may be placed around tube 70 during manufacturing to seal those portions of opening 75 that do not include expandable tube 70. Seal 76 may be any suitable seal, and is used to ensure that the food product stored in nested inner cup 30 remains fresh until use. As mentioned above, a user of dual-compartment food container 10 may exert upward pressure to expand dual-compartment food container 10. This upward pressure may also cause expandable tube 70 to expand. A user may then dispense the food product stored in nested inner cup 30 and may also dispose of any food waste such as seed and nut shells into outer cup 20 through an opening 29 in surface 25.

Figure 5A:
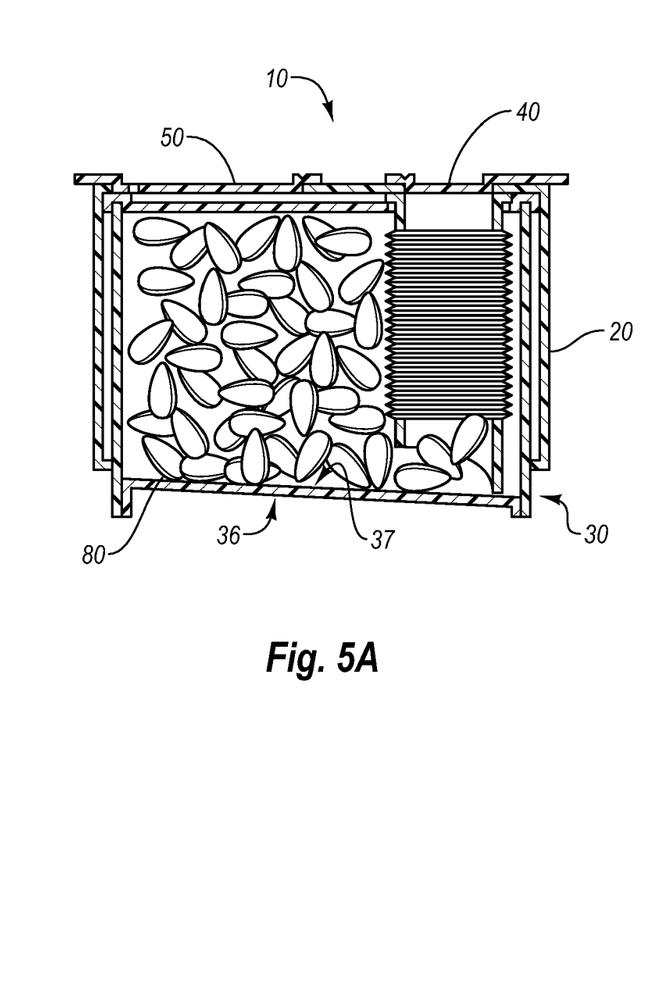
FIGS. 5A and 5B illustrate alternative interior views of an embodiment of the present invention.
Figure 5B:
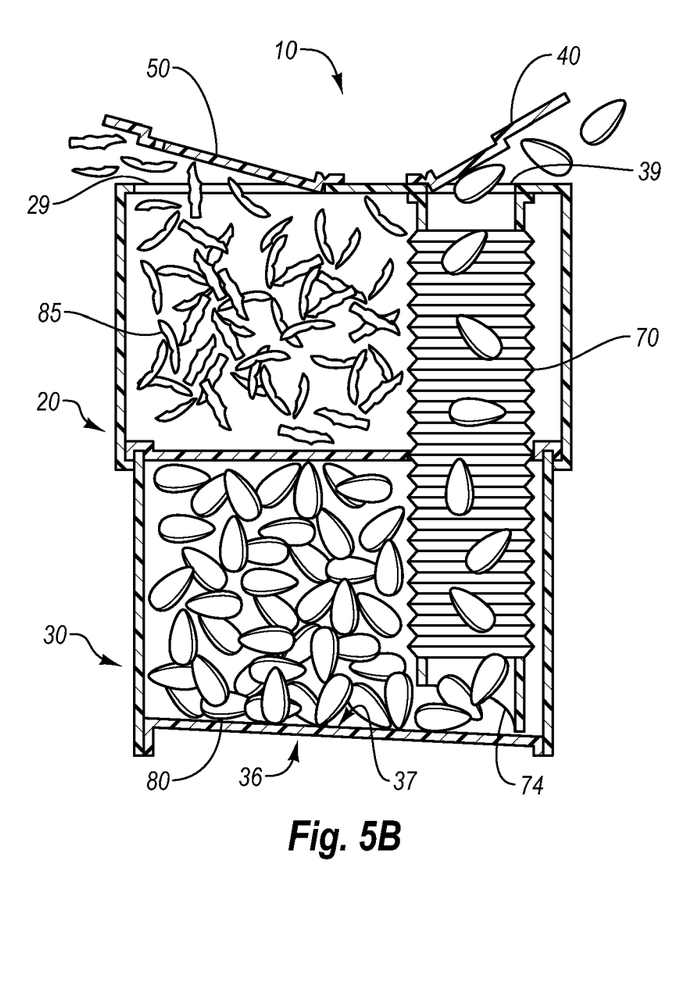

Turning now to FIGS. 5A and 5B, alternative interior views of dual-compartment food container 10 are shown. Specifically, FIG. 5A shows a food product 80 being stored in nested inner cup 30 while dual-compartment food container 10 is in a collapsed position prior to use. FIG. 5B, on the other hand, shows food product 80 being dispensed through expandable tube 70 at opening 39 when dual-compartment food container 10 is in an expanded position. As illustrated, food product 80 enters expandable tube 70 at end 74 and flows through tube 70 to opening 39. FIG. 5B also shows a food waste product 85 that has been discarded into outer cup 20 through opening 29.

Figure 6A:
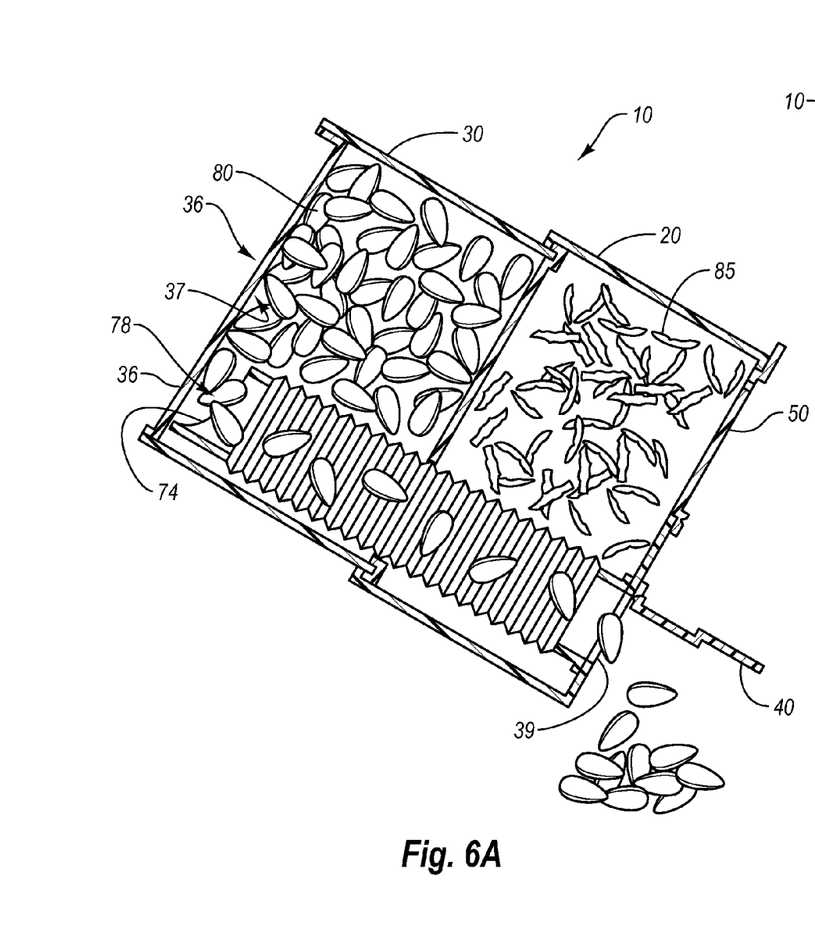
FIGS. 6A and 6B illustrate alternative views of an embodiment of the present invention dispensing food product.
Figure 6B:
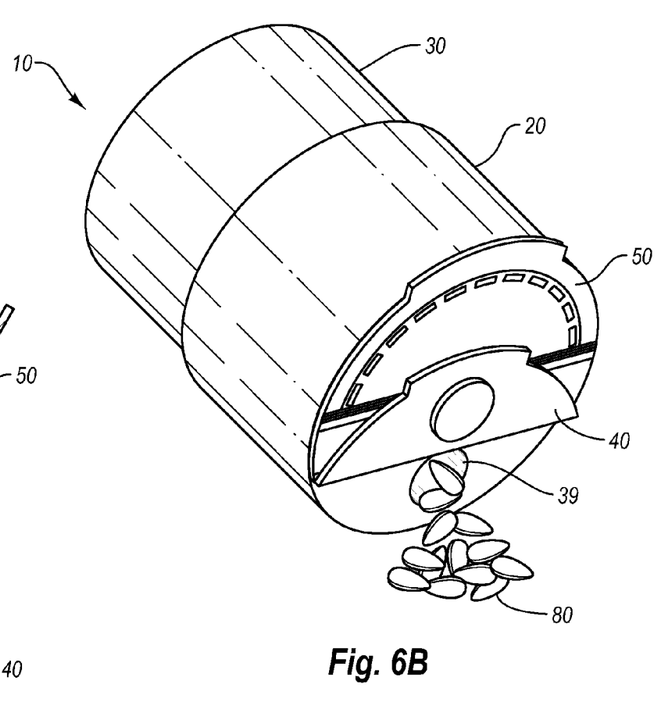

Referring now to FIGS. 6A and 6B, alternative views of dual-compartment food container 10 dispensing food product 80 are illustrated. For example, FIG. 6A shows an interior view of dual-compartment food container 10 tilted in a downward direction to allow food product 80 to flow through expandable tube 70 from the opening at tube end 74 to opening 39. FIG. 6B shows an exterior view of product being dispensed out of opening 39. Note that tube end 74 sits a distance 78 above bottom surface 36. The size of distance 78 is a factor in controlling how much of food product 80 is dispensed at a time. For example, if the structure of dual-compartment food container 10 is designed to make the distance 78 smaller by situating tube end 74 closer to bottom surface 36, the result will typically be that a smaller amount of food product 80 is dispensed. Conversely, making the distance 78 larger by making bottom end 74 further from bottom surface 36 will typically result in a larger amount of food product 80 being dispensed. In some embodiments, the distance 78 may be set by a manufacturer of dual-compartment food container 10 so as to optimize the amount of food product 80 dispensed at a time. In other embodiments, a user may be able to set the distance 78 to a desired size.

As mentioned above, in some embodiments bottom surface 36 includes a sloped inner surface 37. As illustrated in FIG. 6A (and in FIGS. 4 and 5), implementing sloped inner surface 37 aids in the dispensing of food product 80. As shown, sloped inner surface 37 allows food product 80 to slide down the slope toward tube end 74 when being dispensed. Accordingly, the food product 80 is more easily able to flow through expandable tube 70 from the opening at tube end 74 to opening 39. In addition, sloped inner surface 37 helps to prevent any food product 80 from becoming stuck in nested inner cup 30 as the food product will naturally slide down the slope toward tube end 74.

Figure 7A:
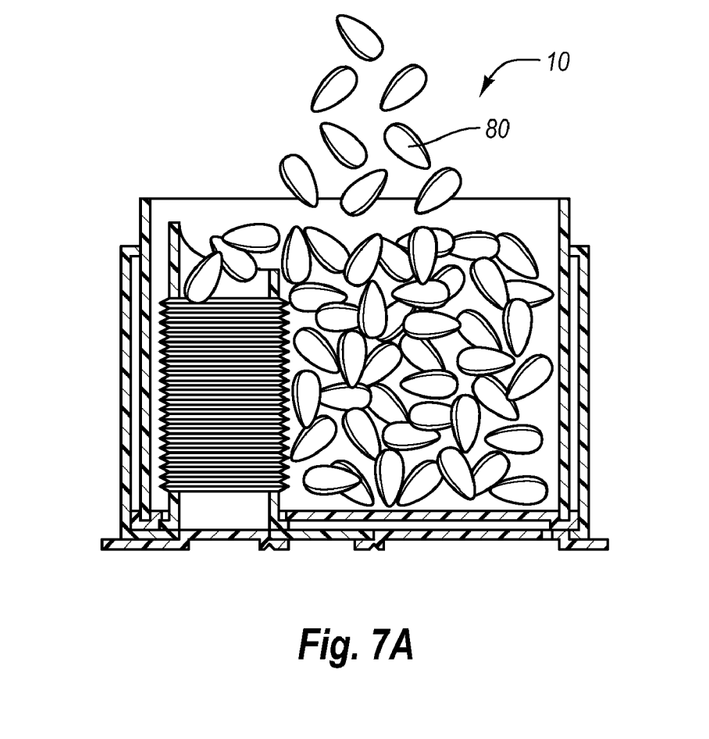
FIGS. 7A and 7B illustrate alternative views of loading food product into a an embodiment of the present invention.
Figure 7B:
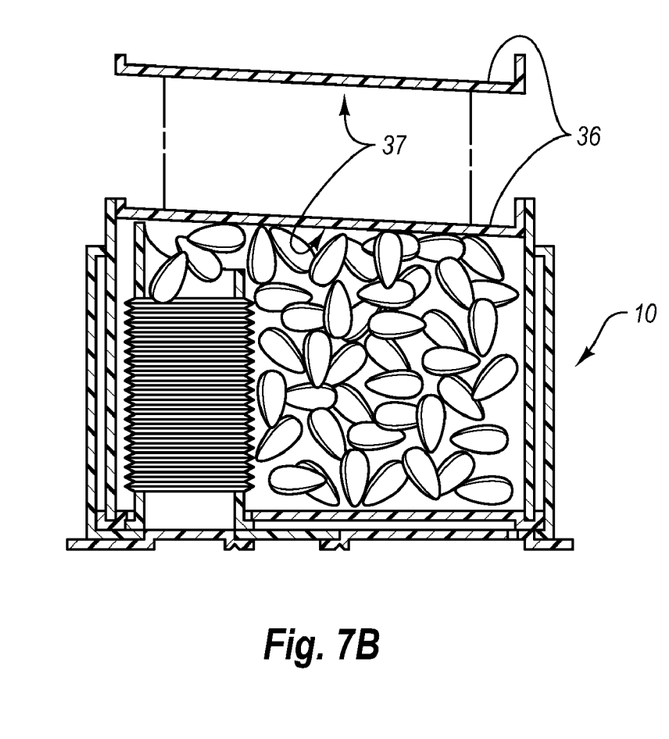

FIGS. 7A and 7B show one embodiment of loading food product 80 into nested inner cup 30. As shown in FIGS. 7A and 7B, bottom surface 36 may be removed and the food product 80 may be placed into nested inner cup 80. Bottom surface 36 may then be placed onto nested inner cup 30. In some embodiments, dual-compartment food container 10 is designed to only be used once and then disposed of. In such embodiments, the food product 80 is placed into nested inner cup 30 at manufacture time and bottom surface 36 is affixed in a non-removable manner. Once a user has eaten the entire food product 80, the dual-compartment food container 10 is thrown away.

In other embodiments, dual-compartment food container 10 may be designed to be reusable. In such embodiments, surface 36 may be removable to allow a user to place food product 80 into nested inner cup 30 when the original food product 80 has been eaten or in cases where food product 80 is not placed into nested inner cup 30 at manufacture time.

Figure 8:
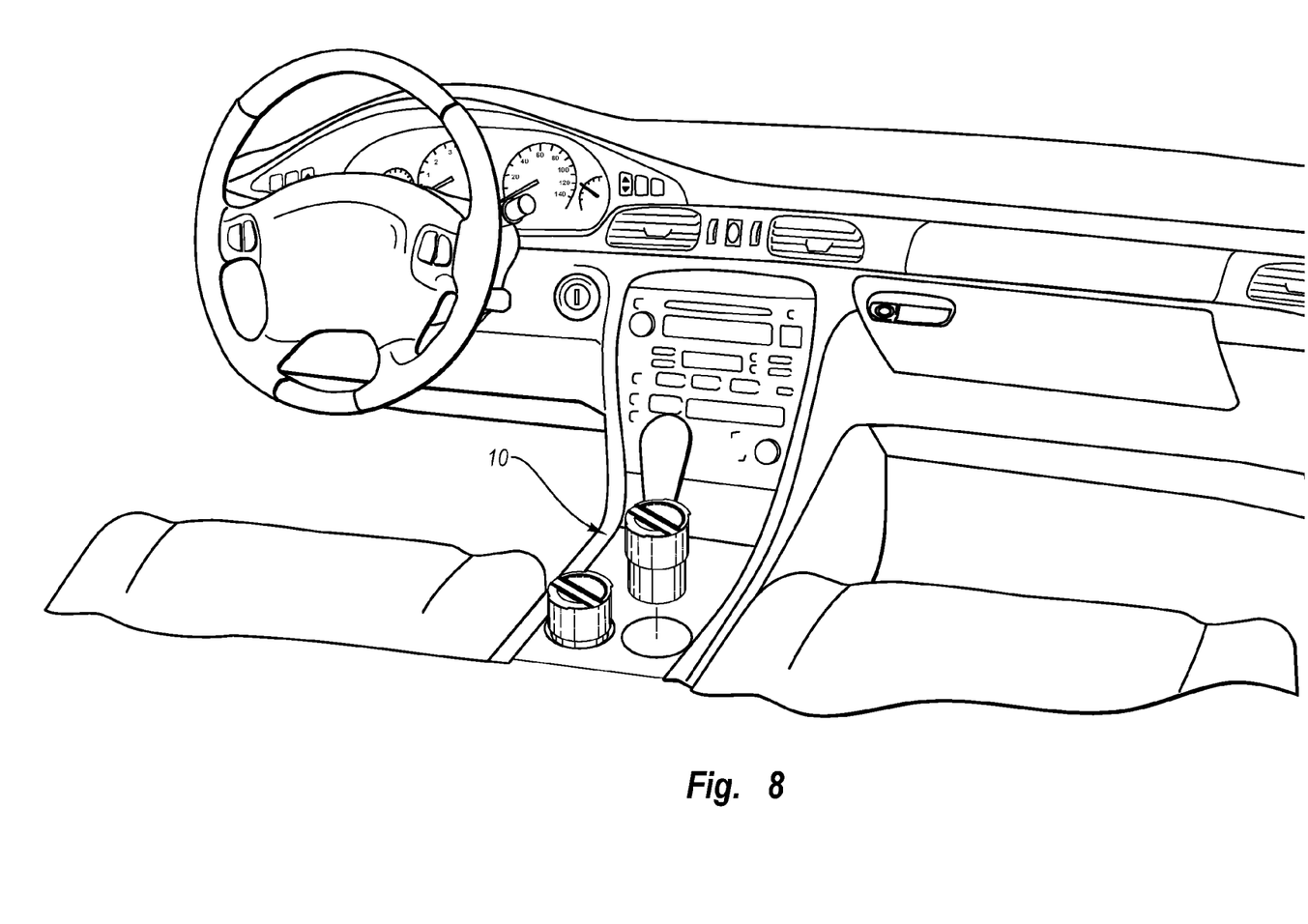
FIG. 8 illustrates an external view of an embodiment of the present invention.

FIG. 8 shows that in some embodiments, dual-compartment food container 10 may be shaped to fit into standard automobile cup holders. This feature advantageously allows passengers in automobiles to consume the food product 80 stored in dual-compartment food container 10 while providing a convenient disposal location. As may be appreciated, when automobile passengers eating sunflower seeds or nuts, it may be difficult to dispose of the seed or nut shells without making a mess on the automobile floor if the dual-compartment food containers of the invention are not used. The principles of the present invention provide an easy way for automobile passengers dispense of food product and to dispose of any food waste product.

Figure 9:
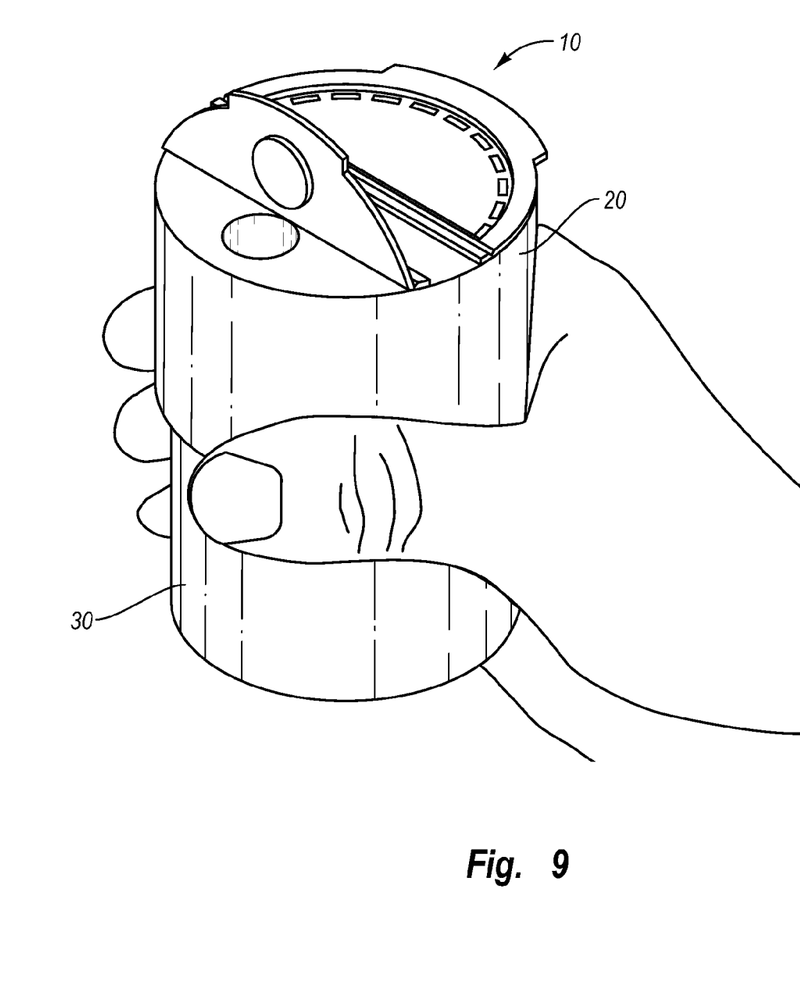
FIG. 9 illustrates an external view of an embodiment of the present invention.

Some embodiments of the dual-compartment food container 10 of the present invention are advantageously shaped to allow for primary use with a single hand. As is illustrated in FIG. 9, a user is able to hold these embodiments of dual-compartment food container 10 with a single hand. For food product 80, such as sunflower seeds, the user may dispense from nested inner cup 30 the sunflower seeds directly into his or her mouth. The user may then directly spit or otherwise place any waste shells 85 into outer cup 20. This feature is especially advantageous when the eater is performing some other activity that permits the eater to have only one hand available.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A food dispensing and waste storage container assembly comprising:
   a first opening;
   a second opening;
   a first compartment defining a first cavity;
   a second compartment movable in relation to the first compartment, wherein at least a portion of the first compartment is contained within the second compartment when the container assembly is in a first position and wherein the second compartment defines a second cavity when the container assembly is in a second position; and
   an expandable connection means for placing the first compartment into communication with at least one of the first and second openings such that food product stored in the first compartment may be dispensed at least one of the first and second openings,
   wherein, in the first position of the container assembly, the expandable connection means is configured to fit within the first compartment and, in the second position of the container assembly, the expandable connection means is configured to extend through the second cavity defined by the second compartment.

2. The container assembly as recited in claim 1, further comprising:
   a first lid configured to cover the first opening; and
   a second lid configured to cover the second opening, the first and second lids being coupled to a portion of the container assembly.

3. The container assembly as recited in claim 2, wherein at least one of the first and second lids includes one or more slots or vents for allowing air to flow into the first or second compartments.

4. The container assembly as recited in claim 1, wherein the expandable connection means includes a tube having a concertina structure.

5. The container assembly as recited in claim 1, wherein a lower portion of an outer surface of the second compartment is configured to form an interference fit with an upper portion of an outer surface of the first compartment when the container assembly is in the second position.

6. The container assembly as recited in claim 1, wherein the first compartment is configured to store food product and the second compartment is configured to receive food waste product, such that the food product can be dispensed at one of the first and second opening, and the food waste product can be received at the other of the first and second opening.

7. The container assembly as recited in claim 6, wherein the food product comprises one of sunflower seeds or shelled nuts and the food waste product comprises the shells of the sunflower seeds or shelled nuts.

8. The container assembly as recited in claim 1, wherein the first compartment includes a bottom surface with a sloped inner surface that is non-perpendicular with respect to an adjacent inner wall of the first compartment.

9. A container comprising:
   a first compartment defining a first cavity;
   a second compartment housing at least a portion of said first compartment therein, said second compartment having a first opening and a second opening, wherein said second compartment is movable relative to said first compartment to form a second cavity; and a tube coupled to said second opening and said first cavity such that food contained in said first cavity can be dispensed through said second opening, wherein the tube is selectively expandable in response to movement of the second opening of the second compartment when said second compartment is moved in relation to said first compartment to form said second cavity.

10. The container as recited in claim 9, wherein said first compartment comprises:

a top surface configured to act as a bottom surface of said second compartment when said second compartment defines said second cavity;

a third opening in said top surface configured to allow said tube access from the first compartment to said second opening; and one or more seals coupled to said top surface, said one or more seals covering those portions of said third opening that said tube does not pass through and permitting passage of said tube through said third opening when said tube is selectively expanded.

11. The container as recited in claim 9, wherein the first compartment comprises a bottom surface at an end of the container that is opposite the second compartment, the bottom surface being configured to be removable, such that food product may be placed into the first compartment for storage.

12. The container as recited in claim 11, wherein the bottom surface of the first compartment includes a sloped inner surface that is non-perpendicular with respect to an adjacent inner wall of the first compartment.

13. The container as recited in claim 9, wherein a top surface of the second compartment has coupled thereon a first lid for sealing the first opening and a second lid for sealing the second opening, the first lid including one or more vents or slots.

14. The container as recited in claim 9, wherein a removable seal is placed over the second opening to at least partially preserve the freshness of any food product stored in the first compartment.

15. An expandable dual-compartment container for the dispensing of food product and the storage of food waste product comprising:

a first compartment defining a first cavity;

a second compartment moveable in relation to the first cavity to define a second cavity, the second compartment having a first opening and a second opening; and a connection means for placing the first compartment in communication with the second opening such that food stored in the first compartment can be dispensed through the second opening, wherein the connection means is selectively expandable in response to movement of the first opening of the second compartment when said second compartment is moved in relation to said first compartment to form said second cavity.

16. The dual-compartment container as recited in claim 15, wherein a lower portion of an outer surface of the second compartment is configured to form an interference fit with an upper portion of an outer surface of the first compartment when the dual-compartment container assembly is in an expanded position.

17. The dual-compartment container as recited in claim 15, further comprising:

a first lid configured to cover the first opening; and a second lid configured to cover the second opening, the first and second lids being coupled to a top surface of the second compartment, wherein the first lid includes one or more slots or vents for allowing air to flow into the second compartment.

18. The dual-compartment container as recited in claim 15, wherein the connection means includes a tube configured to be movable in relation to the first compartment.

19. The dual-compartment container as recited in claim 15, wherein the first compartment is configured to store food product and the second compartment is configured to receive food waste product.

20. The dual-compartment container as recited in claim 19, wherein the food product comprises one of sunflower seeds or shelled nuts and the food waste product comprises the shells of the sunflower seeds or shelled nuts.

21. The dual-compartment container as recited in claim 15, wherein the size of a distance between an opening in a bottom portion of the connection means and a lower surface of the first compartment is a factor in controlling the amount of food product dispensed from the first compartment at the second opening.

22. The dual-compartment container as recited in claim 15, wherein the container is configured to fit into a standard automobile cup holder.

23. The dual-compartment container as recited in claim 15, wherein the container is configured to be used with one hand.

24. The dual-compartment container as recited in claim 15, wherein the connection means is configured to dispense the food product when a user tips the dual-compartment food container to the point where gravity causes the food product to be dispensed through the second opening.

* * * * *